(No Model.) 2 Sheets—Sheet 1.

T. J. SULLIVAN.
ROD PACKING FOR VOLATILE GASES.

No. 431,293. Patented July 1, 1890.

Witnesses:
S. B. Brewer
W. M. Brown

Inventor:
Timothy J. Sullivan,
by William H. Low,
Attorney.

(No Model.) 2 Sheets—Sheet 2.

T. J. SULLIVAN.
ROD PACKING FOR VOLATILE GASES.

No. 431,293. Patented July 1, 1890.

Witnesses:

Inventor:
TIMOTHY J. SULLIVAN,
by William H. Low
Attorney.

UNITED STATES PATENT OFFICE.

TIMOTHY J. SULLIVAN, OF ALBANY, NEW YORK.

ROD-PACKING FOR VOLATILE GASES.

SPECIFICATION forming part of Letters Patent No. 431,293, dated July 1, 1890.

Application filed January 31, 1887. Serial No. 226,031. (No model.)

*To all whom it may concern:*

Be it known that I, TIMOTHY J. SULLIVAN, of the city and county of Albany, in the State of New York, have invented new and useful Improvements in Rod-Packing for Volatile Gases, of which the following is a specification.

Great difficulty has heretofore been encountered in providing an efficient stuffing-box for the piston-rods of pumps used for pumping highly-volatile gases or fluids employed in refrigerative processes. Said difficulty has mainly arisen from the extreme rarity of the volatile gases, which find, through the most infinitesimal openings, ample outlets for escape, and this escape, beside the waste of the gases, creates another trouble, which is found in the liability of the lubricant used on the piston-rod and other adjacent parts of the pump becoming congealed by the action of the escaping gases, and thereby becoming practically useless.

The object of my invention is to remedy these defects; and to this end my invention consists in forming a close chamber for containing oil or other lubricant directly under the lower end of the pump-cylinder, the lower head of said cylinder forming the upper side of said chamber, and a second head fixed at a suitable distance below the lower head of the pump forming the lower side, both of said heads being provided with stuffing-boxes for the pump piston-rod, the inner stuffing-box having an automatic device whereby its gland can be adjusted from the exterior, the lubricant-chamber being provided with a coil of steam-pipe for the purpose of keeping the lubricant in a liquid condition, and said lubricant forming an effective seal for preventing the escape of the gases from the cylinder through said stuffing-boxes.

Figure 1:
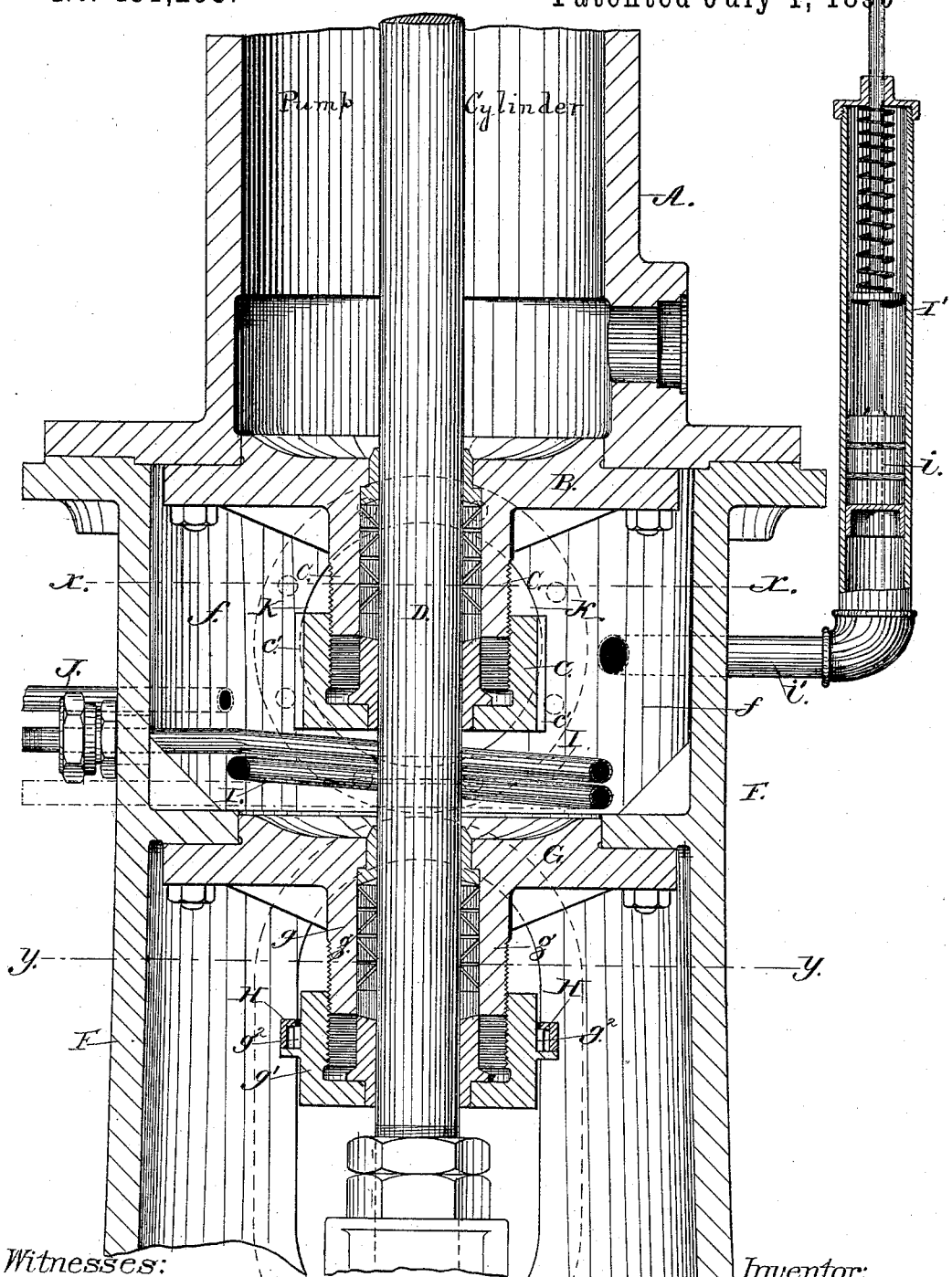
Figure 2:
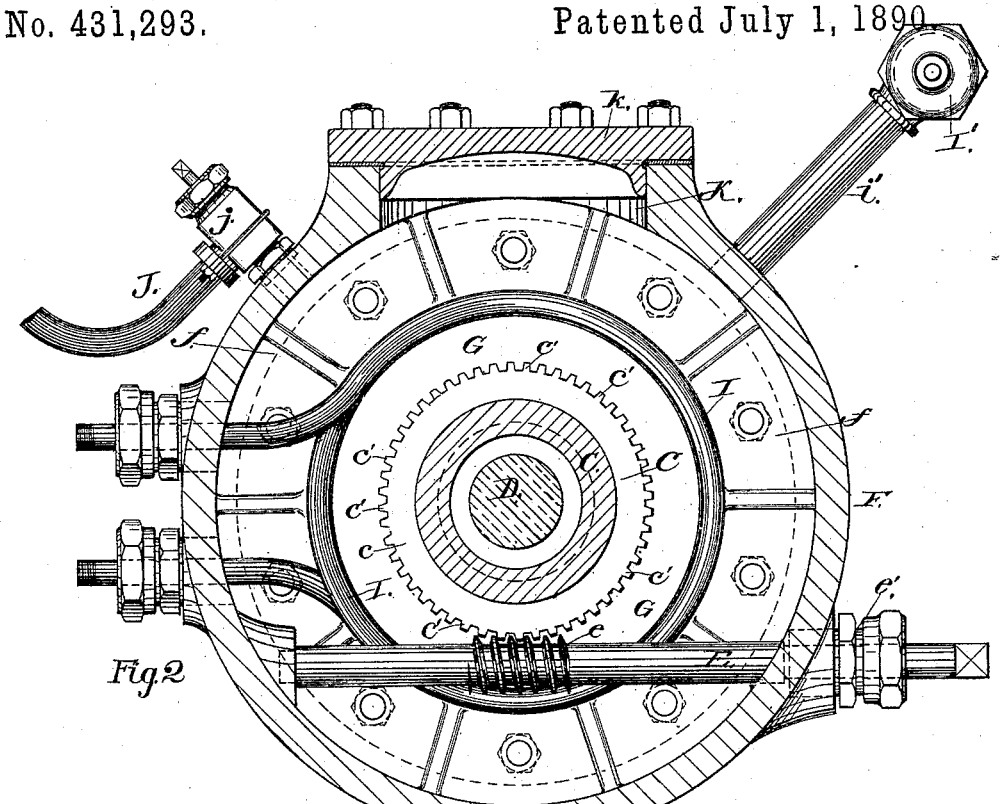
Figure 3:
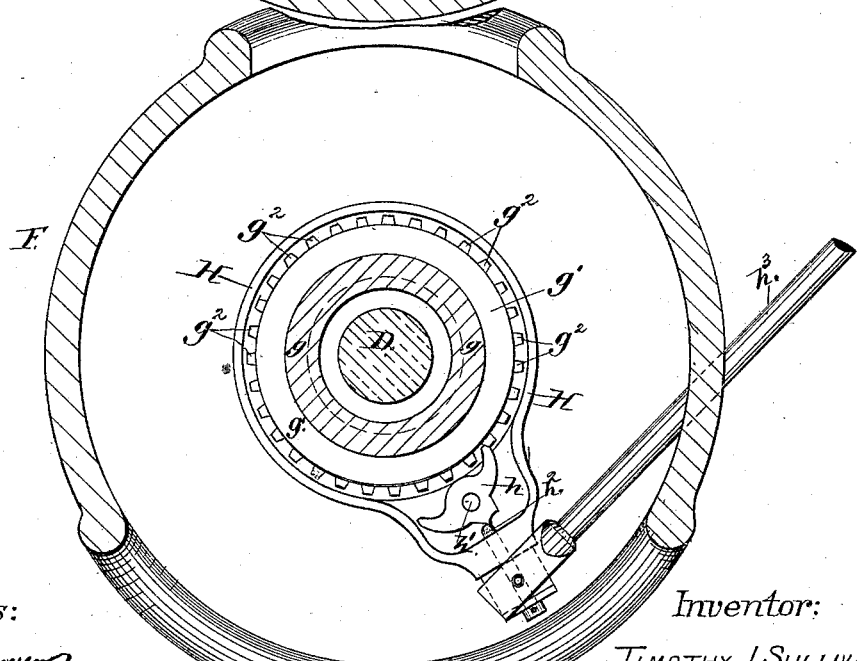

In the accompanying drawings, which are herein referred to and form part of this specification, Figure 1 is a vertical section showing the lower part of the cylinder and upper part of the frame of an inverted vertical pump containing my improvements; and Figs. 2 and 3 are horizontal sections of the same at the lines $x$ $x$ and $y$ $y$, respectively.

As represented in the drawings, A is the pump-cylinder, made in the usual form, and having its lower head B, provided with a stuffing-box C, through which the piston-rod D of said pump reciprocates. Said stuffing-box is made in the form of an annular standing rim with a screw-thread formed around its outer side, and should contain metallic, fibrous, or other suitable packing, forming a tight joint around the piston-rod. The gland $c$ for said stuffing-box is made in the form of a nut fitted to screw onto the stuffing-box, and provided around its periphery with a series of cogs or teeth $c'$, with which the worm $e$ on the transverse shaft E engages. One end of the latter projects through a stuffing-box $e'$ outside of the frame F, so that a wheel, wrench, or other appliance can be attached to said shaft and afford the means for imparting a rotatory motion to the latter when occasion requires.

The upper end of the frame F is made cylindrical in form, and the cylinder A is fitted to the top thereof, so as to form a tight joint therewith. A head G is fixed in the upper part of the frame F to form a close chamber $f$ for containing oil or other lubricant, which lubricant, besides lubricating the piston-rod D, forms an effective seal for preventing the escape of any volatile gas around the piston-rod. The head G is provided with a stuffing-box $g$, through which the piston-rod D reciprocates, and which is preferably made in the form of an annular rim with a screw-thread cut around its periphery. Said stuffing-box should be filled with any suitable packing for obtaining a tight joint around the piston-rod. The gland $g'$ of said stuffing-box is made in the form of a nut, which is fitted to screw on the stuffing-box $g$, and is provided with a series of cogs or teeth $g^2$. A yoke H is fitted to a cylindrical part of the gland $g'$, so that a vibratory movement can be imparted to said yoke on said gland, and a double pawl $h$ is pivoted at $h'$ to said yoke in such manner that either end of said pawl can be thrown into engagement with the cogs $g^2$, according to the direction in which the gland $g'$ is to be turned; or, while the gland $g'$ is required to remain in a fixed position, the pawl $h$ may be turned on its pivot, so that the central notch in its back will be held by the pin $h^2$, so that both ends of the pawl will be kept clear from contact with the cogs $g^2$. A rod $h^3$ is pivoted to the outer end of the yoke H and projects through the side of the frame F and affords the means for manipulating the yoke H and its attached pawl from the outside of the structure whenever the gland $g'$ requires adjusting.

A steam-coil I, through which will circulate steam from a boiler, from the exhaust of an engine, or from both, is fixed in the chamber $f$, for the purpose of keeping the lubricant in said chamber in a liquid condition. This feature I find an essential one, as the excessive cold produced by the gases in the pump-cylinder tends to congeal the lubricant. To provide for the expansion of the lubricant by the heat imparted from the steam-coil, a compensating column, consisting of a cylinder I', containing a spring-actuated piston $i$, and connecting with the chamber $f$ by means of the pipe $i'$, is erected at one side of the frame F, the arrangement being such that when the lubricant has become expanded in volume to a sufficient degree to overcome the resistance of the spring $i^2$ the piston $i$ will be forced upwardly in the cylinder I', and, per contra, when the lubricant contracts in volume by parting with any portion of its heat, the spring-actuated piston $i$ will force the lubricant from the cylinder I' into the chamber $f$.

A supply-pipe J, provided with a check-valve $j$, is connected with the chamber $f$, for the purpose of injecting lubricant into said chamber.

A man-hole K, provided with the cover $k$, affords access to the interior of the chamber $f$, when necessity requires, for the purpose of renewing the packing in the stuffing-box $g$, or for any other purpose which requires admission into said chamber.

When preferred, the chamber $f$ may be formed in the end of the cylinder A by fitting the head B within said cylinder and securing the head G to the flange of said cylinder, both of said heads having their respective stuffing-boxes, as hereinbefore described.

I claim as my invention—

A pump provided with a close chamber for containing lubricant, through which the piston-rod of the pump reciprocates, the said chamber being formed between two independent heads, each having its own stuffing-box, and the inner stuffing-box being fitted to be operated from the exterior of the pump, as herein specified.

TIMOTHY J. SULLIVAN.

Witnesses:
 WM. H. LOW,
 S. B. BREWER.